US012242353B2

United States Patent
Lee

(10) Patent No.: US 12,242,353 B2
(45) Date of Patent: Mar. 4, 2025

(54) MAINTAINING AND UPDATING A BACKUP VIEW OF AN APPLICATION AND ITS ASSOCIATED OBJECTS

(71) Applicant: Cohesity, Inc., San Jose, CA (US)

(72) Inventor: Steve Tai Hung Lee, Lexington, MA (US)

(73) Assignee: Cohesity, Inc., San Jose, CA (US)

( * ) Notice: Subject to any disclaimer, the term of this patent is extended or adjusted under 35 U.S.C. 154(b) by 0 days.

(21) Appl. No.: 17/960,515

(22) Filed: Oct. 5, 2022

(65) Prior Publication Data

US 2023/0195578 A1 Jun. 22, 2023

Related U.S. Application Data

(60) Provisional application No. 63/291,799, filed on Dec. 20, 2021.

(51) Int. Cl.
*G06F 11/14* (2006.01)

(52) U.S. Cl.
CPC ...... *G06F 11/1451* (2013.01); *G06F 2201/84* (2013.01)

(58) Field of Classification Search
CPC .......................... G06F 11/1451; G06F 2201/84
See application file for complete search history.

(56) References Cited

U.S. PATENT DOCUMENTS

| 7,330,997 | B1 * | 2/2008 | Odom | G06F 11/1464 |
| | | | | 714/6.23 |
| 7,509,468 | B1 * | 3/2009 | Dalal | G06F 21/562 |
| | | | | 711/163 |
| 9,996,426 | B1 * | 6/2018 | Pogde | G06F 16/172 |
| 2003/0200480 | A1 * | 10/2003 | Beattie | G06F 11/1456 |
| | | | | 714/E11.12 |
| 2010/0107158 | A1 * | 4/2010 | Chen | G06F 11/203 |
| | | | | 718/1 |
| 2017/0168903 | A1 * | 6/2017 | Dornemann | G06F 11/2038 |
| 2023/0062644 | A1 | 3/2023 | Qiu et al. | |
| 2023/0079486 | A1 | 3/2023 | Yarlagadda et al. | |

\* cited by examiner

*Primary Examiner* — Kannan Shanmugasundaram
(74) *Attorney, Agent, or Firm* — Shumaker & Sieffert, P.A.

(57) ABSTRACT

A first backup of source data is performed. A second backup of the source data is determined to be performed at least in part by determining a plurality of objects that have changed since the first backup and determining a corresponding backup type for each of the plurality of objects that have changed since the first backup. Based on the determined corresponding backup types, a second backup of the source data is performed including by performing an incremental backup of a first portion of the plurality of objects that have changed since the first backup and a full backup of a second portion of the plurality of objects that have changed since the first backup.

20 Claims, 10 Drawing Sheets

MAINTAINING AND UPDATING A BACKUP VIEW OF AN APPLICATION AND ITS ASSOCIATED OBJECTS

CROSS REFERENCE TO OTHER APPLICATIONS

This application claims priority to U.S. Provisional Patent Application No. 63/291,799 entitled MAINTAINING AND UPDATING A BACKUP VIEW OF AN APPLICATION AND ITS ASSOCIATED OBJECTS filed Dec. 20, 2021 which is incorporated herein by reference for all purposes.

BACKGROUND OF THE INVENTION

An application, such as a database, may provide the capability to maintain a backup of the application and its associated objects. The application backup may be updated by merging incremental changes into the application backup to roll forward the application backup to a more present time. If the application or application data becomes corrupted, the application can only be restored to the point in time corresponding to the application backup. A storage system may be coupled to a source system hosting the application. The storage system may perform the application backup according to a schedule. This enables the application to be restored to a point in time for which an application backup was performed in the event the application or application data becomes corrupted.

BRIEF DESCRIPTION OF THE DRAWINGS

Various embodiments of the invention are disclosed in the following detailed description and the accompanying drawings.

DETAILED DESCRIPTION

Figure 1:
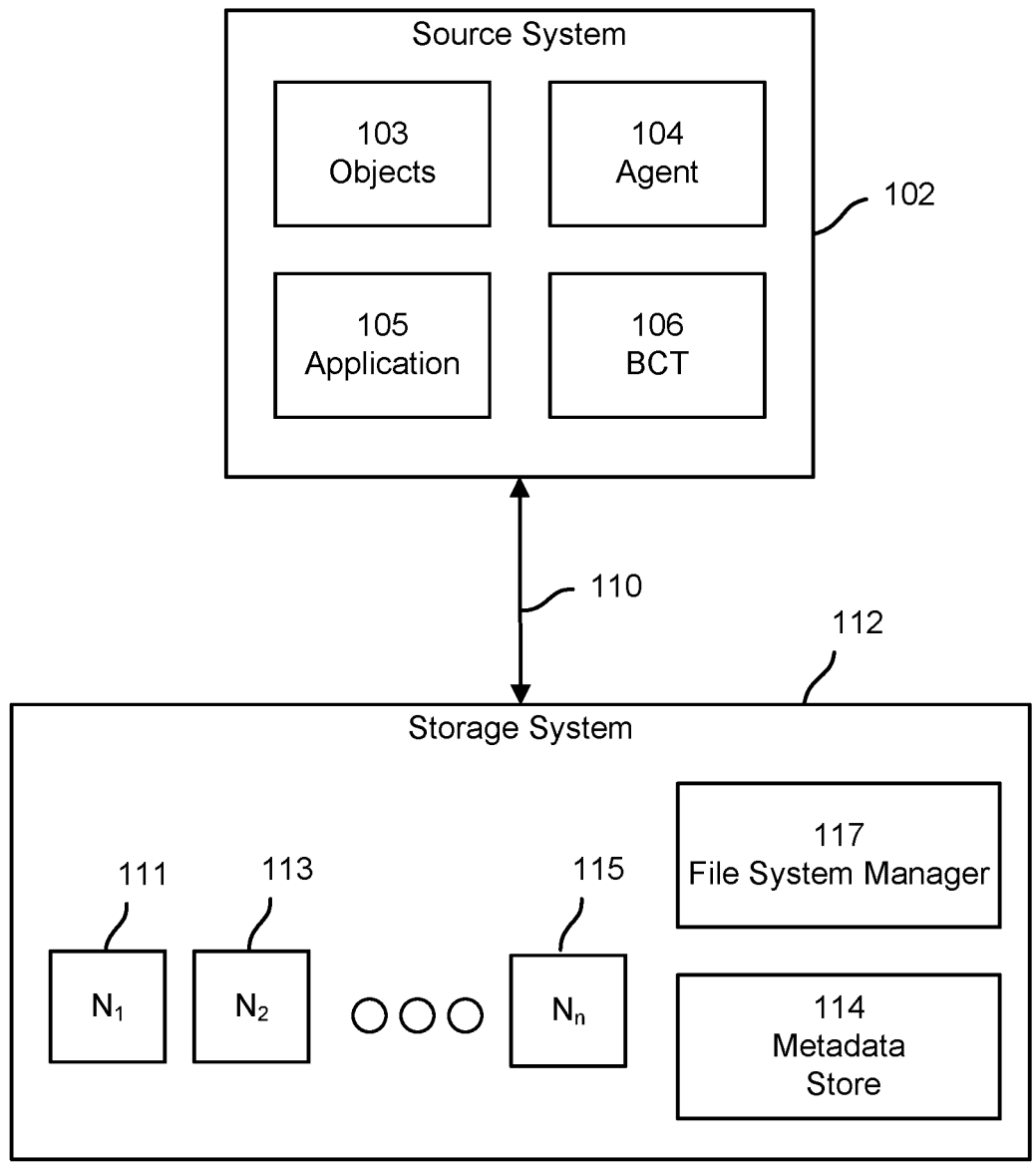
FIG. 1 is a block diagram illustrating an embodiment of a system for maintaining and updating a backup view of an application and its associated objects.

A storage system stores a plurality of backup snapshots of an application hosted on a source system. An initial backup snapshot corresponds to a full backup of the application, which is associated with a plurality of objects. The application may generate a corresponding image copy of each of the plurality of objects. The storage system may perform a full backup of the application by requesting the corresponding image copies to be generated and then receiving and storing the corresponding image copies. The storage system maintains a backup view of the application that is comprised of the corresponding image copies to maintain a backup view of the application. The backup view of the application corresponds to a state of the application at a time at which a most recent backup is performed. After the corresponding image copies are stored, the storage system performs a backup snapshot of the corresponding image copies and generates metadata that enables the data associated with the backup snapshot (e.g., metadata, data content) of the corresponding image copies to be located. An example of metadata generated by the storage system is a tree data structure as described in U.S. patent application Ser. No. 17/476,873 entitled MANAGING OBJECTS STORED AT A REMOTE STORAGE filed Sep. 16, 2021, which is incorporated herein by reference for all purposes. The backup snapshot and the generated metadata represent a fully hydrated backup of the application because it represents a complete state of the application and its associated objects for the time at which the full backup was performed.

The subsequent backup snapshots may correspond to incremental backups of the application. An incremental backup of the application includes data associated with one or more objects that were previously backed up and/or data associated with one or more new objects (e.g., object data content and object metadata). When an incremental backup of the application is performed, the storage system receives and stores one or more files corresponding to the incremental changes associated with one or more of the plurality of objects and/or a corresponding image copy for each of the one or more new objects. The one or more files corresponding to the incremental changes associated with one or more of the plurality of objects and/or a corresponding image copy for each of the one or more new objects are utilized to update the backup view of the application.

The incremental changes associated with the one or more plurality of objects must be merged with the corresponding backed up image copies of the one or more objects to update the backup view of the application. However, the one or more files corresponding to the incremental changes associated with one or more of the plurality of objects are in a proprietary format associated with the application. The storage system must rely on the application to merge the incremental changes and roll forward the corresponding image copies of the one or more application objects stored on the storage system. To perform an incremental merge of an object, the application reads the one or more files corresponding to the incremental changes to identify the changed blocks associated with the object, extracts the identified blocks from the one or more files corresponding to the incremental changes, and applies the changes to a most recent version of the image copy of the object that is stored on the storage system. As a result, the storage system is unable to roll forward one or more corresponding backed up image copies of one or more objects to a point in time at which the incremental backup was performed without the assistance of the application.

The amount of time needed to perform the incremental merge is unpredictable because the amount of time to merge the incremental changes associated with an object with a most recent image copy of the object increases non-linearly as the percentage of change of the object since the most recent image copy of the object increases. For example, a storage system may require X amount of time to perform a full backup of the object (e.g., an image copy of the object is received and stored) having a size of 20 TB at time to. If 5 TB of the object changed between t0 and t1, the application may require 1.5× the amount of time to merge the incremental changes with the most recent image copy of the object. If 10 TB of the object changed between time to and time t1, the application may require 5× the amount of time to merge the incremental changes with the most recent image copy of the object.

In contrast, performing a full backup of an object is predictable because the amount of time to perform a full backup of an object that increases in size is linear. For example, if a first object having a size of 20 TB is backed up, it may take X amount of time to perform a full backup of the first object. If a second object having a size of 40 TB is backed up, it may take 2× amount of time to perform the full backup of the second object.

An entity associated with the application (e.g., user, company, enterprise, institution, government, organization, etc.) has a finite window in which a backup of the application and its associated objects may be performed. The inability to complete the backup within the finite window may have significant consequences. For example, some objects may not be backed up at all because other objects required a longer than expected amount of time to backup (e.g., an object having a percentage of change greater than a threshold percentage since a most recent backup). The application is vulnerable until the next time these objects are backed up. For example, an object may be scheduled to be backed up every day at 12 AM. On Sunday, the object is backed up. The object was unable to be backed up on Monday because the merging of incremental changes associated with another object required a longer than expected amount of time to be performed. On Tuesday at 11:59 pm, the object became corrupted. On Wednesday, the object was restored using the backed up copy, but the most recent backed up version is from Sunday. The data gap between the backed up copy of the object and the object right before it became corrupted can be significant.

A technique to maintain and update a backup view of an application and its associated objects is disclosed herein. The technique disclosed herein causes objects having a percentage of change greater than a threshold percentage since a most recent backup to be backed up within an expected time frame. Although the technique disclosed herein is described with respect to an application and its objects, the technique is applicable for any data source that is associated with block change tracking (BCT), is capable of generating a full backup of an object and an incremental backup of the object, and is capable of merging incremental changes associated with the incremental backup with a previous backup. For objects associated with an application having a percentage of change since a most recent backup that is greater than the threshold percentage, the technique disclosed herein reduces the amount of time needed to perform a backup of those objects because the backup time is not subject to the non-linear merge times associated with the one or more objects having a percentage of change since a most recent backup greater than the threshold percentage. As a result, an entity associated with the application can confidently schedule backups that will finish within a backup window and the data gap between different versions of a backed up object is minimized.

A full backup of a plurality of objects (e.g., data files, log files, database files, content files, virtual machines, etc.) associated with an application hosted on a source system is performed. The application hosted on the source system generates a corresponding image copy of each of the plurality of objects. The storage system may perform the full backup by requesting the source system to generate the corresponding image copy for each of the plurality of objects, and then receiving and storing the corresponding image copy for each of the plurality of objects. After the corresponding image copies are stored, the storage system performs a backup snapshot of the corresponding image copies and generates metadata that enables the data associated with the backup snapshot of the corresponding image copies to be located.

A backup of the application may be performed in response to a condition being satisfied, such as the occurrence of a scheduled backup time (e.g., every day at 12 am), in response to a threshold amount of data change, or in response to a command (e.g., user command, storage system command). Prior to an incremental backup of the application being performed, the storage system determines which of the objects associated with the application have changed since a most recent backup (e.g., a full backup or an incremental backup). The application is associated with a BCT, which indicates the one or more blocks that have changed since the most recent backup. The BCT may or may not be enabled. If enabled, the BCT updates a block change tracking file when a data block has changed.

The storage system may query the application to identify the one or more objects that have changed since the most recent backup and to determine a corresponding percentage of change since a most recent backup for each of the one or more identified changed objects. In response, the application utilizes the block change tracking file to identify the one or more changed objects and determines a corresponding percentage of change since a most recent backup for each of the one or more identified changed objects. The application provides a query response to the storage system.

In response to receiving the query response, the storage system compares the corresponding percentage of change since a most recent backup for each of the changed objects to a threshold percentage (e.g., 30% percentage of change since a most recent backup). The storage system determines a type of backup to be performed for a changed object based on whether the percentage of change since a most recent backup for a changed object is greater than a threshold percentage. In the event the percentage of change since a most recent backup for a changed object is greater than the threshold percentage, the storage system determines that a full backup of the changed object needs to be performed. In the event the percentage of change since a most recent backup for a changed object is not greater than the threshold percentage, the storage system determines that an incremental backup of the changed object needs to be performed.

In some embodiments, the percentage of change since a most recent backup for none of the changed objects is greater than the threshold percentage. In such embodiments, an incremental backup is performed for each of the changed objects.

In some embodiments, a first portion of the changed objects have a change rate that is greater than the threshold percentage and a second portion of the changed objects have a change rate that is not greater than the threshold percentage. In such embodiments, a full backup is performed for objects having a change rate that is greater than the threshold percentage and an incremental backup is performed for objects having a change rate that is not greater than the threshold percentage.

In some embodiments, the percentage of change since a most recent backup for all of the changed objects is greater than the threshold percentage. In such embodiments, a full backup is performed for each of the changed objects.

The application maintains a data structure (e.g., a control file) that indicates the one or more objects associated with the application that were previously backed up to the storage system and backup information associated with each of one or more objects. In some embodiments, the backup information indicates that the most recent backup of an object was a full backup. In some embodiments, the backup information indicates that the most recent backup of an object was an incremental backup. The application utilizes the data structure to determine whether to generate an image copy of an object or one or more files corresponding to the incremental changes associated with an object. Even though the application may have previously generated an image copy of an object that was backed up by the storage system, the application is configured to generate an image copy of an object if the data structure does not include an entry corresponding to the object. The storage system may leverage this property to control an incremental backup of the application.

Prior to an incremental backup of the application being performed, the storage system deletes the one or more image copies corresponding to the one or more changed objects having a percentage of change since a most recent backup greater than the threshold percentage from the backup view of the application and sends to the application a request to remove from the data structure one or more entries corresponding to the one or more changed objects having a percentage of change since a most recent backup greater than the threshold percentage. In response, the application is configured to modify the data structure as requested.

Subsequently, the storage system sends to the application a request to perform an incremental backup of the application. In response to receiving the request, the application inspects the backup view of the application stored on the storage system to determine the one or more image copies of objects that are backed up to the storage system and utilizes the data structure to determine whether to generate an image copy of an object or one or more files corresponding to the incremental changes associated with an object. The application determines to generate an image copy of an object in the event the backup view of the application does not include a corresponding image copy of the object and an identifier associated with the object is not included in the data structure (e.g., the object is a new object since the most recent backup or appears to be a new object because an entry corresponding to a changed object was removed from the data structure). The application determines to generate one or more files corresponding to the incremental changes associated with an object in the event the backup view of the application includes a corresponding image copy of the object and the data structure indicates that the most recent backup for the object was a full backup or an incremental backup.

The storage system performs the incremental backup of the application by receiving and storing one or more files corresponding to the incremental changes associated with one or more of the plurality of objects and/or a corresponding image copy for each of the one or more objects determined by the application to have not been backed up to the storage system. The storage system performs deduplication (e.g., in-line deduplication, post-processing deduplication, partial in-line deduplication, partial post-processing deduplication, etc.) on the received data. This reduces the amount of storage used to store the data associated with the incremental backup. In particular, the amount of storage used to store the data associated with a full backup of an object having a percentage of change since a most recent backup greater than the threshold percentage is reduced because data content of the object that was previously stored will not be stored and the storage system already stores the data chunks representing the unchanged portion of the object. Although the storage system requests a full backup of the object having a percentage of change since a most recent backup greater than the threshold percentage, the amount of storage required for the full backup is much less than the size of the object image copy. After the data associated with the incremental backup of the application is stored, the application updates the backup view of the application by merging the incremental changes associated with the one or more plurality of objects with the corresponding backed up image copies of the one or more objects.

After the corresponding backed up image copies are updated, the storage system generates a fully hydrated backup of the application by performing a backup snapshot of the corresponding image copies and generating metadata that enables the data associated with the backup snapshot of the corresponding image copies to be located. For example, the generated metadata includes a corresponding new object metadata structure for each of the one or more objects having a percentage of change since a most recent backup greater than the threshold percentage.

Other systems may recreate the state of the application and its associated objects at a particular point in time by combining a full backup of the application and its associated objects with one or more incremental backups. In contrast, the storage system is configured to maintain each incremental backup of the application as a fully hydrated backup. A fully hydrated backup is a self-contained backup that represents a complete state of the application and its associated objects at a particular point in time without having to combine a full backup and one or more incremental backups to generate the complete state of the application and its associated objects at the particular point in time.

FIG. 1 is a block diagram illustrating an embodiment of a system for maintaining and updating a backup view of an application and its associated objects. In the example shown, system 100 includes source system 102 and storage system 112.

Source system 102 may be a server, a virtual machine, a container, a pod, a database, and/or a computing device for which data is backed up. Source system 102 may be comprised of one or more servers, one or more computing devices, one or more storage devices, and/or a combination thereof. A backup of source system 102 may be performed according to one or more backup policies. In some embodiments, a backup policy indicates that data associated with objects 103 is to be backed up on a periodic basis (e.g., hourly, daily, weekly, monthly, etc.), when a threshold size of data has changed, in response to a command from a user associated with source system 102, or in response to a command from storage system 112. In some embodiments, source system 102 is running in a cloud environment, such as a public or private cloud.

Source system 102 is configured to run application 105. An example of an application is a database. Source system 102 may include one or more storage volumes (not shown) that are configured to store data associated with objects 103. An object may be a data file, a log file, a database file, a content file, a virtual machine, etc.

In some embodiments, source system 102 includes agent 104. Agent 104 may be configured to cause source system 102 to generate image copies of application 105 and its associated objects 103 and/or one or more files corresponding to the incremental changes associated with application 105 and its associated objects 103. In some embodiments, agent 104 is included in application 105. Agent 104 may cause application 105 to generate one or more image copies of one or more objects and/or one or more files corresponding to the incremental changes associated with one or more objects. In some embodiments, an agent 104 is running on source system 102 and a separate agent is running in application 105. In some embodiments, objects 103 includes a function that enables the objects 103 to generate one or more image copies of one or more objects and/or one or more files corresponding to the incremental changes associated with one or more objects on its own without agent 104. In some embodiments, source system 102 includes a function that enables system 102 to generate one or more image copies of one or more objects and/or one or more files corresponding to the incremental changes associated with one or more objects on its own without agent 104. In some embodiments, storage system 112 provides instructions to source system 102, causing source system 102 to generate one or more image copies of one or more objects and/or one or more files corresponding to the incremental changes associated with one or more objects without the agent 104. In some embodiments, storage system 112 provides instructions to application 105, causing application 105 to generate one or more image copies of one or more objects and/or one or more files corresponding to the incremental changes associated with one or more objects without the agent 104. In some embodiments, storage system 112 provides instructions to application 105, causing application 105 to generate one or more image copies of one or more objects and/or one or more files corresponding to the incremental changes associated with one or more objects with the help of agent 104.

Application 105 is associated with BCT 106, which indicates the one or more blocks that have changed since the most recent backup. BCT 106 may or may not be enabled. If enabled, BCT 106 updates a block change tracking file when a data block has changed.

Source system 102 is coupled to storage system 112 via connection 110. Connection 110 may be a wired or wireless connection. Connection 110 may be a LAN, WAN, intranet, the Internet, and/or a combination thereof.

Storage system 112 is comprised of a storage cluster that includes a plurality of storage nodes 111, 113, 115. Although three storage nodes are shown, storage system 112 may be comprised of n storage nodes. In some embodiments, the storage nodes of storage system 112 are homogenous nodes where each storage node has the same capabilities (e.g., processing, storage, memory, etc.). In some embodiments, at least one of the storage nodes of a storage system is a heterogeneous node with different capabilities (e.g., processing, storage, memory, etc.) than the other storage nodes of a storage system.

In some embodiments, a storage node of storage system 112 includes a processor, memory, and a plurality of storage devices. The plurality of storage devices may include one or more solid state drives, one or more hard disk drives, or a combination thereof. Backed up data may be stored in the one or more solid state drives, one or more hard disk drives, or a combination thereof.

In some embodiments, a storage node of storage system 112 includes a processor and memory, and is coupled to a separate storage device. The separate storage device may include one or more storage devices (e.g., flash storage devices). A storage device may be segmented into a plurality of partitions. Each of the storage nodes may be allocated one or more of the partitions. The one or more partitions allocated to a storage node may be configured to store data associated with some or all of the changed objects that were backed up to the secondary storage system. For example, the separate storage device may be segmented into 10 partitions and the secondary storage system may include 10 storage nodes. A storage node of the 10 storage nodes may be allocated one of the 10 partitions.

In some embodiments, a storage node of storage system 112 includes a processor, memory, and a storage device. The storage node may be coupled to a separate storage device. The separate storage device may include one or more storage devices. A storage device may be segmented into a plurality of partitions. Each of the storage nodes may be allocated one or more of the partitions. The one or more partitions allocated to a storage node may be configured to store data associated with some or all of the changed objects that were backed up to the storage system. For example, the separate storage device may be segmented into 10 partitions and the secondary storage system may include 10 storage nodes. A storage node of the 10 storage nodes may be allocated one of the 10 partitions.

Storage system 112 may be a cloud instantiation of a storage system. A configuration of a cloud instantiation of storage system 112 may be a virtual replica of a storage system. For example, a storage system may be comprised of three storage nodes, each storage node with a storage capacity of 10 TB. A cloud instantiation of the storage system may be comprised of three virtual nodes, each virtual node with a storage capacity of 10 TB. In other embodiments, a cloud instantiation of a storage system may have more storage capacity than an on-premises instantiation of a storage system. In other embodiments, a cloud instantiation of a storage system may have less storage capacity than an on-premises instantiation of a storage system. In some embodiments, source system 102 is located in a datacenter (physical or virtual) and storage system 112 is a cloud instantiation of a storage system.

Storage system 112 performs a backup of source system 102 by ingesting data from source system 102 and storing the data as a plurality of data chunks in one or more chunk files that are stored in one or more storage devices associated with one or more storage nodes 111, 113, 115 of storage system 112.

In some embodiments, storage system 112 chunks the ingested data into a plurality of data chunks and generates a corresponding chunk identifier for each of the data chunks (e.g., SHA-1 hash value). Storage system 112 maintains a chunk metadata data structure (e.g., a table) in metadata store 114 that indicates the data chunks that are already stored by storage system 112. Each entry of the chunk metadata data structure may associate a chunk identifier associated with a data chunk with a chunk file identifier of a chunk file storing the data chunk. Storage system 112 compares a chunk identifier associated with an ingested data chunk with a chunk identifier included in the chunk metadata data structure. In the event the chunk identifier associated with the ingested data chunk is in the chunk metadata data structure, then storage system 112 deletes the ingested data chunk from a memory of storage system 112. In the event the chunk identifier associated with the ingested data chunk is not in the chunk metadata data structure, then storage system 112 stores the ingested data chunk in a storage device of storage system 112.

In some embodiments, source system 102 chunks data associated with a backup into a plurality of data chunks, determines a corresponding chunk identifier (e.g., SHA-1 hash value) for each of the plurality of data chunks, and sends the chunk identifiers to the storage system 112. Subsequently, the storage system 112 determines whether any of the chunk identifiers are included in the chunk metadata data structure. Storage system 112 requests for any data chunks associated with determined chunk identifiers not included in the chunk metadata data structure from source system 102. Source system 102 provides the requested data chunk(s) and storage system 112 ingests and stores the requested data chunk(s).

Storage system 112 includes a file system manager 117 that is configured to organize the backed up data included in a backup snapshot of a backup view of application 105 using a tree data structure. The tree data structure enables the data associated with the backup snapshot of the backup view of application 105 (e.g., metadata, data content) to be located. An example of the tree data structure is a snapshot tree, which may be based on a B+ tree structure (or other type of tree structure in other embodiments). Storage system 112 may store a plurality of tree data structures in metadata store 114, which is accessible by storage nodes 111, 113, 115. Storage system 112 may generate a snapshot tree and one or more object metadata structures each time the objects 103 are backed up. Metadata store 114 may be stored in a memory of storage system 112. Metadata store 114 may be a distributed metadata store and stored in the memories of storage nodes 111, 113, 115.

The tree data structure may be used to capture different views of application 105 and objects 103. A view of application 105 may correspond to a full backup of application 105 or an incremental backup of application 105. A view of objects 103 may correspond to a full backup of objects 103 or an incremental backup of objects 103. The tree data structure allows a chain of snapshot trees to be linked together by allowing a node of a later version of a snapshot tree to reference a node of a previous version of a snapshot tree. For example, a root node or an intermediate node of a snapshot tree corresponding to a second backup may reference an intermediate node or leaf node of a snapshot tree corresponding to a first backup. The tree data structure enables storage system 112 to perform a chain of incremental backups (referred to as "incremental forever") of application 105 after an initial full backup of application 105 is performed.

A snapshot tree in combination with the plurality of object metadata structures is a representation of a fully hydrated restoration point because it provides a complete view of application 105 at a particular moment in time. A fully hydrated restoration point is a restoration point that is ready for use without having to reconstruct a plurality of backups to use it. Instead of reconstructing a restoration point by starting with a full backup and applying one or more data changes associated with one or more incremental backups to the data associated with the full backup, storage system 112 maintains fully hydrated restoration points. Any object associated with application 105 for which there is an associated reference restoration point may be restored utilizing the snapshot tree and the object metadata structure corresponding to the object, regardless if the associated restoration point is associated with a full backup or an incremental backup.

A snapshot tree may provide a view of an application at a particular point in time. The snapshot tree includes a root node, one or more levels of one or more intermediate nodes associated with the root node, and one or more leaf nodes associated with an intermediate node of the lowest intermediate level. The root node of a snapshot tree includes one or more pointers to one or more intermediate nodes. Each intermediate node includes one or more pointers to other nodes (e.g., a lower intermediate node or a leaf node). A leaf node may store file system metadata (e.g., owner, created, last update, size, file permissions, etc.), data associated with an object that is less than or equal to a limit size (e.g., 256 kB), a pointer to another leaf node, a pointer to an object metadata structure, (e.g., Blob structure), etc. A leaf node of the snapshot tree may correspond to an inode.

An object metadata structure may be generated for an object associated with the application that is greater than the limit size (e.g., 256 kB). The object metadata structure is configured to store the metadata associated with an object that enables the data chunks associated with the object to be located. The object metadata structure includes a root node, one or more levels of one or more intermediate nodes associated with the root node, and one or more leaf nodes associated with an intermediate node of the lowest intermediate level. An object metadata structure is similar to a snapshot tree, but a leaf node of an object metadata structure includes an identifier of a data brick associated with one or more data chunks of the object and metadata associated with the one or more data chunks (e.g., chunk identifier, chunk object identifier, etc.). A leaf node of the snapshot tree may include a pointer to a root node of the object metadata structure corresponding to an object.

A leaf node of an object metadata structure may store metadata information, such as an identifier of a data brick associated with one or more data chunks and information associated with the one or more data chunks. In some embodiments, the information associated with the one or more data chunks includes corresponding object offsets and corresponding chunk identifiers associated with the one or more data chunks. In some embodiments, the information associated with the one or more data chunks also includes corresponding chunk file identifiers associated with one or more chunk files storing the data chunks. In some embodiments, the location of the one or more data chunks associated with a data brick is identified using a chunk metadata data structure and a chunk file metadata data structure stored in metadata store 114. In some embodiments, the location of the one or more data chunks associated with a data brick is identified using a chunk file metadata data structure stored in metadata store 114. The chunk file metadata data structure may include a plurality of entries where each entry associates a chunk identifier associated with a data chunk with a chunk file identifier of a chunk file storing the data chunk, an offset, and a size.

In some embodiments, for data chunks having an entry in the chunk metadata data structure, the location of a data chunk may be determined by traversing a tree data structure to a leaf node and determining a chunk identifier associated with the data chunk. The chunk metadata data structure may be used to determine a chunk file identifier of a chunk file storing the data chunk. The chunk file metadata data structure may be used to determine a location of the data chunk within the chunk file corresponding to the determined chunk file identifier.

Figure 2:
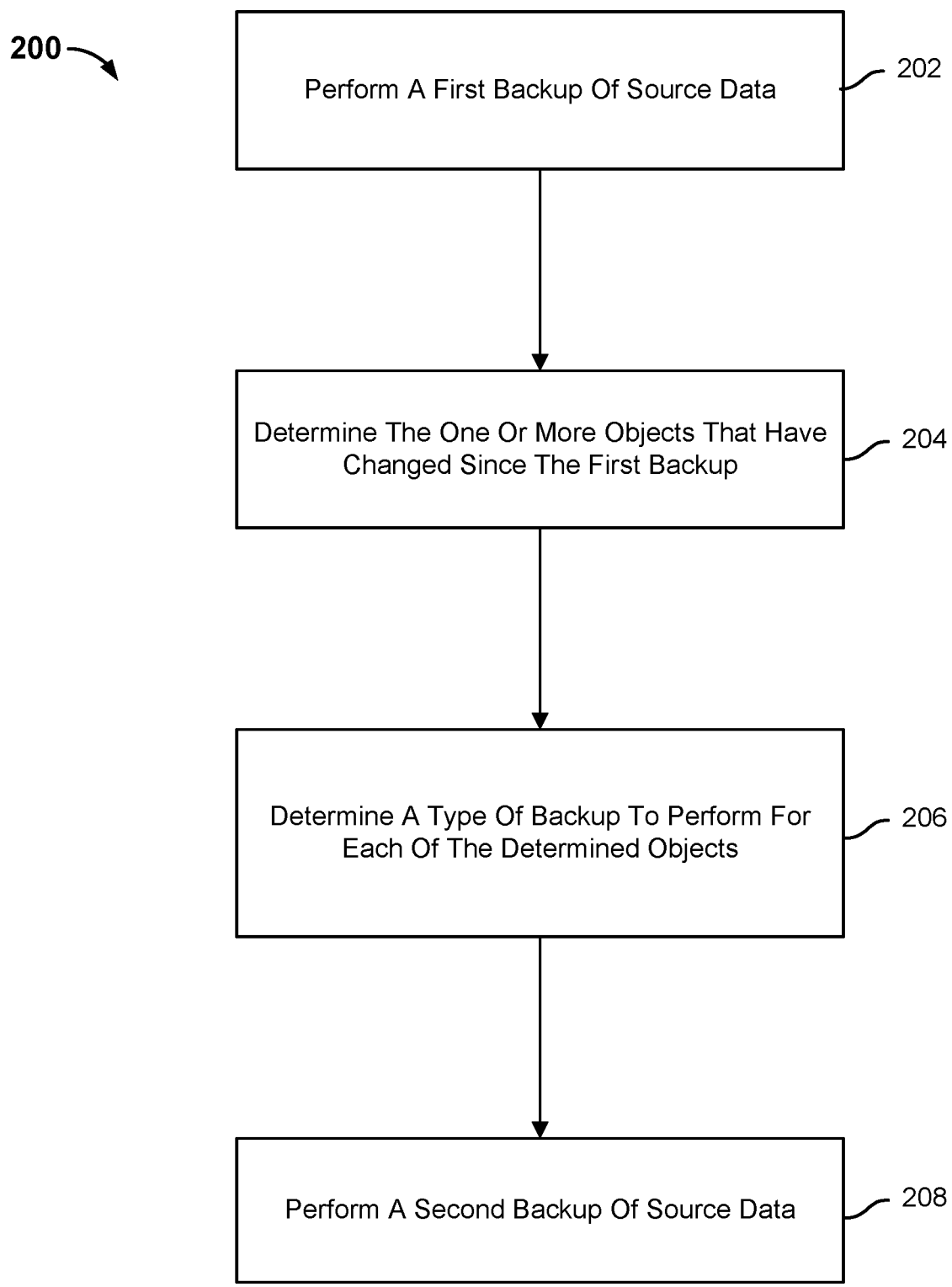
FIG. 2 is a flow diagram illustrating an embodiment of a process for performing an incremental backup of source data.

FIG. 2 is a flow diagram illustrating an embodiment of a process for performing an incremental backup of source data. In the example shown, process 200 may be implemented by a storage system, such as storage system 112.

At 202, a first backup of source data is performed. A source system includes an application, such as a database. The application is associated with one or more objects. The data associated with the one or more objects is received at a storage system from the source system.

In some embodiments, the first backup of source data is a full backup of the source data. The application may generate an image copy for each of the one or more objects. The storage system may perform the first backup by requesting the source system to generate a corresponding image copy for each of the one or more objects and then receiving and storing the one or more image copies. The storage system maintains a backup view of the application that is comprised of the corresponding image copies. The backup view of the application corresponds to a state of the application at a time at which a most recent backup is performed. The storage system performs a backup snapshot of the one or more image copies and generates metadata that enables the data associated with the backup snapshot of the one or more image copies to be located. The generated metadata is comprised of a snapshot tree and one or more object metadata structures. The generated metadata enables the metadata (e.g., owner, creation date, last update, size, file permissions, etc.) and data chunks associated with each of the one or more objects to be located.

In some embodiments, the first backup of source data is an incremental backup of the source data. The incremental backup of the source data may be performed in a manner described herein.

At 204, the one or more objects that have changed since the first backup are determined. The storage system may query the application to identify the one or more objects that have changed since the most recent backup. The query may include a request to determine a corresponding percentage of change since a most recent backup for each of the one or more identified changed objects.

At 206, a type of backup to perform for each of the determined objects is determined. The application provides a query response to the storage system. In response to receiving the query response, the storage system compares the corresponding percentage of change since a most recent backup for each of the changed objects to a threshold percentage. The storage system determines a type of backup to perform for a changed object based on whether the percentage of change since a most recent backup for a changed object is greater than the threshold percentage.

In the event the percentage of change since a most recent backup for a changed object is greater than the threshold percentage, the storage system determines that a full backup of the changed object needs to be performed. In the event the percentage of change since a most recent backup for a changed object is not greater than the threshold percentage, the storage system determines that an incremental backup of the changed object needs to be performed.

In some embodiments, a user selects the type of backup to perform for an object. In some embodiments, a model is used to determine the type of backup to perform for each of the determined objects. The model may be a machine learning model, a rules-based model, a heuristic model, etc. In some embodiments, a machine learning model is trained to select the type of backup to perform for an object based on previous incremental merge times for the object.

The machine learning model may be trained using a supervised machine learning algorithm. For example, the supervised machine learning algorithm may be a linear regression algorithm, a logistical regression algorithm, a random forest algorithm, a gradient boosted trees algorithm, a support vector machines algorithm, a neural networks algorithm, a decision tree algorithm, a Naïve Bayes algorithm, a nearest neighbor algorithm, or any other type of supervised machine learning algorithm. In some embodiments, the machine learning model is trained using a semi-supervised machine learning algorithm that utilizes one or more labeled data sets and one or more pseudo-labeled data sets. In the embodiments, the machine learning model is trained using a reinforcement machine learning algorithm. For example, the reinforcement machine learning algorithm may be a Q-Learning algorithm, a temporal difference algorithm, a Monte-Carlo tree search algorithm, an asynchronous actor-critic agent's algorithm, or any other type of reinforcement machine learning algorithm. In some embodiments, the machine learning model is trained using an unsupervised machine learning algorithm. For example, clustering methods, anomaly detection, neural network, etc.

In some embodiments, a machine learning model is trained to select the type of backup to perform for an object based on previous percentages of changes for the object. A user may specify an amount of time to complete a backup of an object. A full backup of an object is complete after an image copy of the object is stored. An incremental backup of an object is complete after the incremental changes are stored and the application merges the incremental changes with an image copy of the object. The machine learning model may receive feedback that indicates whether the object was backed up within the specified amount of time. The machine learning model may be re-trained based on the feedback.

At 208, a second backup of the source data is performed. The second backup of the source data is an incremental backup.

The application maintains a data structure that indicates the one or more objects associated with the application that were previously backed up to the storage system and backup information associated with each of the one or more objects. The storage system may leverage this property to control an incremental backup of the application. Prior to the incremental backup of the application being performed, the storage system deletes the one or more image copies corresponding to the one or more changed objects having a percentage of change since a most recent backup greater than the threshold percentage from the backup view of the application and sends to the application a request to remove from a data structure one or more entries corresponding to the one or more changed objects having a percentage of change since a most recent backup greater than the threshold percentage. In response, the application is configured to modify the data structure as requested.

The storage system sends to the application a request to perform an incremental backup of the application. In response to receiving the request, the application inspects the backup view of the application to determine the one or more image copies of objects that are backed up to the storage system and utilizes the data structure to determine whether to generate an image copy of an object or one or more files corresponding to the incremental changes associated with an object. The application determines to generate an image copy of an object in the event the backup view of the application does not include a corresponding image copy of the object and an identifier associated with the object is not included in the data structure (e.g., the object is a new object since the most recent backup or appears to be a new object because an entry corresponding to a changed object was removed from the data structure). The application determines to generate one or more files corresponding to the incremental changes associated with an object in the event the backup view of the application includes a corresponding image copy of the object and the data structure indicates that the most recent backup for the object was a full backup or an incremental backup.

To perform a full backup of an object, the storage system receives and stores an image copy of the object that was generated by the application. In some embodiments, the storage system performs in-line deduplication while the image copy of the object is being ingested. In some embodiments, the storage system performs post-processing deduplication. In some embodiments, the storage system performs partial in-line deduplication and partial post-processing deduplication. An example of a partial in-line deduplication and partial post-processing deduplication process is described in U.S. patent application Ser. No. 17/410,745 entitled PARTIAL IN-LINE DEDUPLICATION AND PARTIAL POST-PROCESSING DEDUPLICATION OF DATA CHUNKS filed Aug. 24, 2021, which is incorporated herein by reference for all purposes. Performing deduplication on an image copy of an object having a percentage of change since a most recent backup greater than the threshold percentage reduces the amount of storage used to store the data associated with the object having a percentage of change since a most recent backup greater than the threshold percentage because data content of the object that was previously stored will not be stored and the storage system already stores the data chunks representing the unchanged portion of the object. Although the storage system requests a full backup of the object having a percentage of change since a most recent backup greater than the threshold percentage, the amount of storage required for the full backup is much less than the size of the object image copy.

To perform an incremental backup of an object, the storage system receives and stores one or more files corresponding to the incremental changes associated with the object that were generated by the application. The one or more files corresponding to the incremental changes associated with the object may include incremental changes associated with one or more other objects. The incremental changes associated with the one or more plurality of objects must be merged with the corresponding backed up image copies of the one or more application files to update the backup view of the application. However, the one or more files corresponding to the incremental changes associated with one or more previously backed up objects are in a proprietary format associated with the application. The incremental changes associated with the one or more previously backed up objects are merged with the backed up image copies of the one or more previously backed up objects to roll forward the backed up image copies of the one or more previously backed up objects. To perform an incremental merge for an object, the application reads the one or more files corresponding to the incremental changes to identify the changed blocks associated with the object, extracts the identified blocks from the one or more files corresponding to the incremental changes, and applies the changes to an image copy of the object that is stored on the storage system.

After the second backup of the source data is completed, the storage system performs a backup snapshot of the corresponding image copies and generates metadata to represent the incremental changes to the one or more objects not having a percentage of change since a most recent backup greater than the threshold percentage and/or to include a corresponding new object metadata structure for each of the one or more objects having a percentage of change since a most recent backup greater than the threshold percentage. In some embodiments, the incremental backup includes an image copy of a new object. The storage system generates metadata to include an object metadata structure corresponding to the new object.

Figure 3:
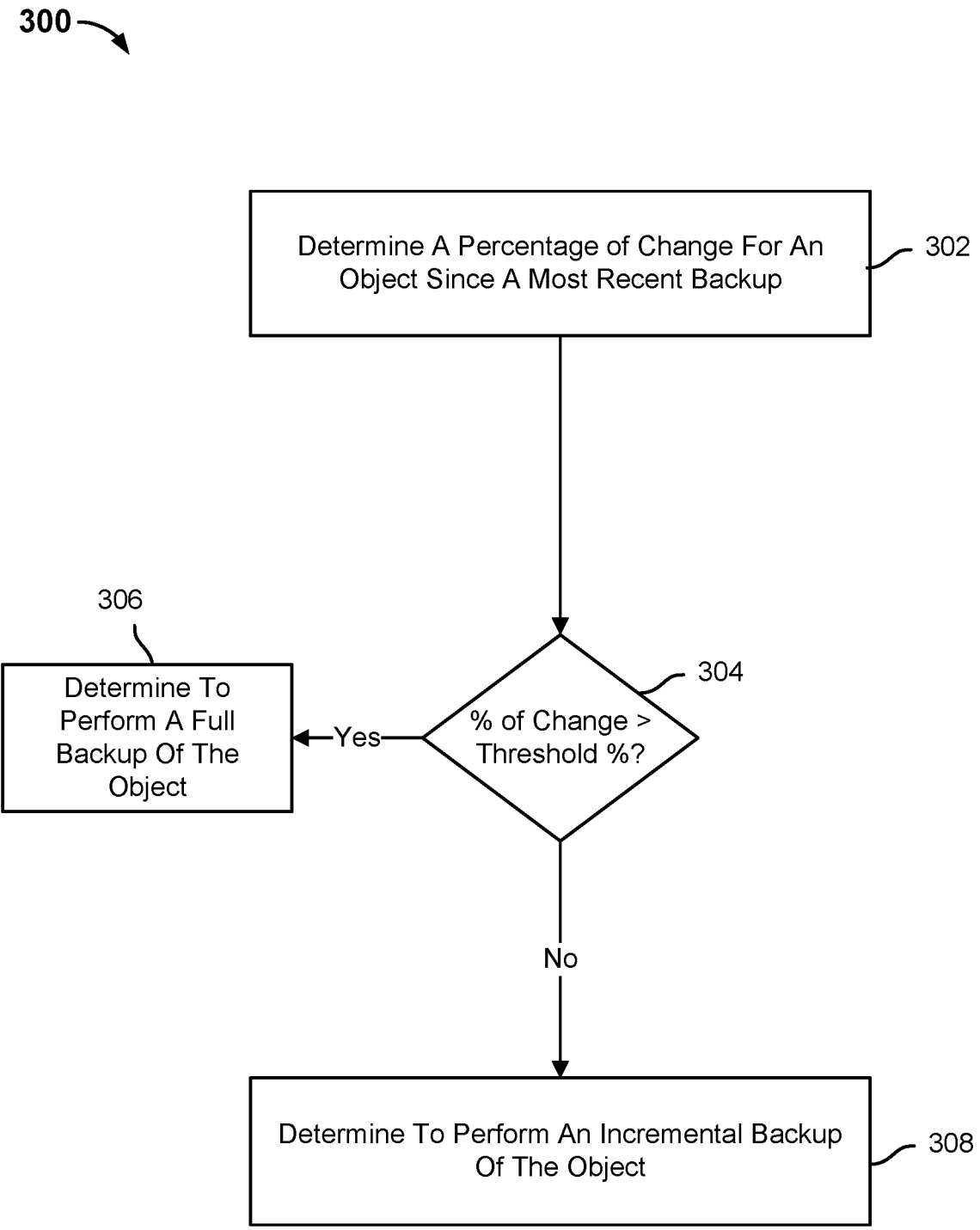
FIG. 3 is a flow diagram illustrating a process of determining a type of backup to perform for an object in accordance with some embodiments.

FIG. 3 is a flow diagram illustrating a process of determining a type of backup to perform for an object in accordance with some embodiments. In the example shown, process 300 may be implemented by a storage system, such as storage system 112. In some embodiments, process 300 is implemented to perform some of step 202 or 206 of process 200. Process 300 may be implemented for each of the objects determined at step 204 of process 200 to have changed since a previous backup.

At 302, a percentage of change for an object since a last backup is determined. The storage system may query an application hosted on a source system to determine a percentage of change since a most recent backup for an object that has changed since a most recent backup. The application includes a BCT that indicates the one or more blocks that have changed since the most recent backup. If enabled, the BCT updates a block change tracking file when a data block has changed. The application utilizes the block change tracking file to identify the one or more changed objects and determines a corresponding percentage of change since a most recent backup for each of the one or more identified changed objects. The application provides a query response that includes a percentage of change since a most recent backup for the object to the storage system.

At 304, it is determined whether a percentage of change for an object since a most recent backup is greater than a threshold percentage. In the event the percentage of change since a most recent backup is greater than the threshold percentage, process 300 proceeds to 306. In the event the percentage of change since a most recent backup is not greater than the threshold percentage, process 300 proceeds to 308.

At 306, a full backup of the object is determined to be performed. At 308, an incremental backup of the object is determined to be performed.

Figure 4:
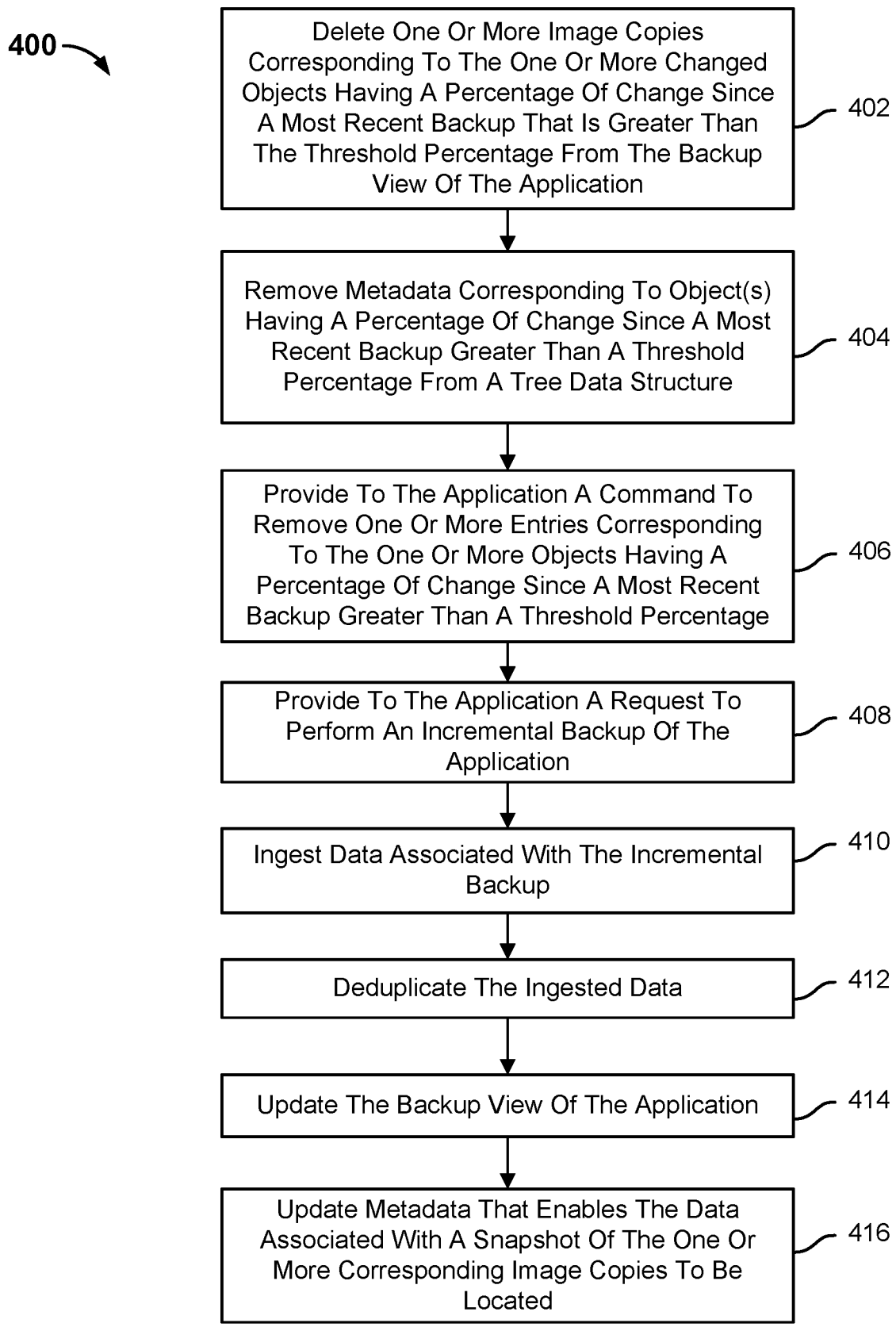
FIG. 4 is a flow diagram illustrating a process for performing an incremental backup for a source data in accordance with some embodiments.

FIG. 4 is a flow diagram illustrating a process for performing an incremental backup of a source data in accordance with some embodiments. In the example shown, process 400 may be implemented by a storage system, such as storage system 112. In some embodiments, process 400 is implemented to perform some or all of step 202 or step 208 of process 200.

At 402, one or more image copies corresponding to the one or more objects having a percentage of change since a most recent backup that is greater than a threshold percentage are deleted from a backup view of an application. The backup view of the application is comprised of corresponding image copies of the one or more objects.

At 404, metadata corresponding to one or more objects having a percentage of change since a most recent backup greater than the threshold percentage are removed from a tree data structure that includes a snapshot tree and a plurality of object metadata structures. Each of the one or more objects having a percentage of change since a most recent backup greater than a threshold percentage has a corresponding object metadata structure. A leaf node of the snapshot tree may include a pointer to a root node of an object metadata structure corresponding to an object having a percentage of change since a most recent backup greater than a threshold percentage. A delete command may be issued that causes the storage system to remove from the leaf node a pointer to an object metadata structure corresponding to an object having a percentage of change since a most recent backup greater than a threshold percentage. The nodes of an object metadata structure corresponding to an object having a percentage of change since a most recent backup greater than a threshold percentage may be removed via a garbage collection process.

At 406, a command to remove one or more entries corresponding to the one or more objects having a percentage change since a most recent backup greater than a threshold percentage is provided to the application. The application maintains a data structure that indicates the one or more objects associated with the application that were previously backed up to the storage system and backup information associated with each of the one or more objects. The application removes the one or more requested entries. By removing the one or more entries corresponding to the one or more objects having a percentage of change since a most recent backup greater than a threshold percentage from the data structure, the application is unaware that those object(s) were previously backed up.

At 408, a request to perform an incremental backup of the application is provided to the application. In response to receiving the request, the application inspects the backup view of the application to determine the one or more image copies of objects that are backed up to the storage system and utilizes the data structure to determine whether to generate an image copy of an object or one or more files corresponding to the incremental changes associated with an object. The application determines to generate an image copy of an object in the event the backup view of the application does not include a corresponding image copy of the object and an identifier associated with the object is not included in the data structure (e.g., the object is a new object since the most recent backup or an entry corresponding to a changed object was removed from the data structure before the request was received). The application determines to generate one or more files corresponding to the incremental changes associated with an object in the event the backup view of the application includes a corresponding image copy of the object and the data structure indicates that the most recent backup for the object was a full backup or an incremental backup.

At 410, data associated with the incremental backup is ingested. The source system provides data associated with one or more objects that were previously backed up and/or data associated with one or more new files. As the data is being ingested, the storage system chunks the ingested data into a plurality of data chunks and generates a corresponding chunk identifier for each of the data chunks (e.g., SHA-1 hash value).

In some embodiments, the source system chunks the data into a plurality of data chunks and provides to the storage system a corresponding identifier for each of the data chunks. In response, the storage system identifies and requests the one or more data chunks that are not currently stored by the storage system. The source system provides the storage system the one or more requested data chunks.

At 412, the ingested data is deduplicated. The storage system maintains a chunk metadata data structure (e.g., a table) in a metadata store that indicates the data chunks that are already stored by the storage system. Each entry of the chunk metadata data structure may associate a chunk identifier associated with a data chunk with a chunk file identifier of a chunk file storing the data chunk. The storage system compares a chunk identifier associated with an ingested data chunk with a chunk identifier included in the chunk metadata data structure. In the event the chunk identifier associated with the ingested data chunk is in the chunk metadata data structure, then the storage system deletes the ingested data chunk from a memory of the storage system. In the event the chunk identifier associated with the ingested data chunk is not in the chunk metadata data structure, then the storage system stores the ingested data chunk in a storage device of the storage system.

In some embodiments, the data is deduplicated during ingestion. In some embodiments, the data is deduplicated after ingestion is completed.

At 414, the backup view of the application is updated. The one or more files corresponding to the incremental changes associated with one or more of the plurality of objects and/or a corresponding image copy for each of the one or more new objects are stored and utilized to update the backup view of the application.

The incremental changes associated with the one or more of the plurality of objects must be merged with the corresponding backed up image copies of the one or more objects to update the backup view of the application. To perform an incremental merge of an object, the application reads the one or more files corresponding to the incremental changes to identify the changed blocks associated with the object, extracts the identified blocks from the one or more files corresponding to the incremental changes, and applies the changes to a most recent version of the image copy of the object that is stored on the storage system.

At 416, the metadata that enables the data associated with a backup snapshot of the one or more corresponding image copies to be located is updated to include metadata for the one or more objects having a percentage of change since a most recent backup greater than the threshold percentage and to include metadata for the one or more objects not having a percentage of change since a most recent backup greater than the threshold percentage. The snapshot tree corresponding to a backup snapshot of the backup view of the application is updated to include a corresponding leaf node for each of the one or more objects having a percentage of change since a most recent backup greater than the threshold percentage. An object metadata structure is generated for each of the one or more objects having a percentage of change since a most recent backup greater than the threshold percentage. Each of the corresponding leaf nodes includes a pointer to a root node of one of the one or more generated object metadata structures.

Figure 5:
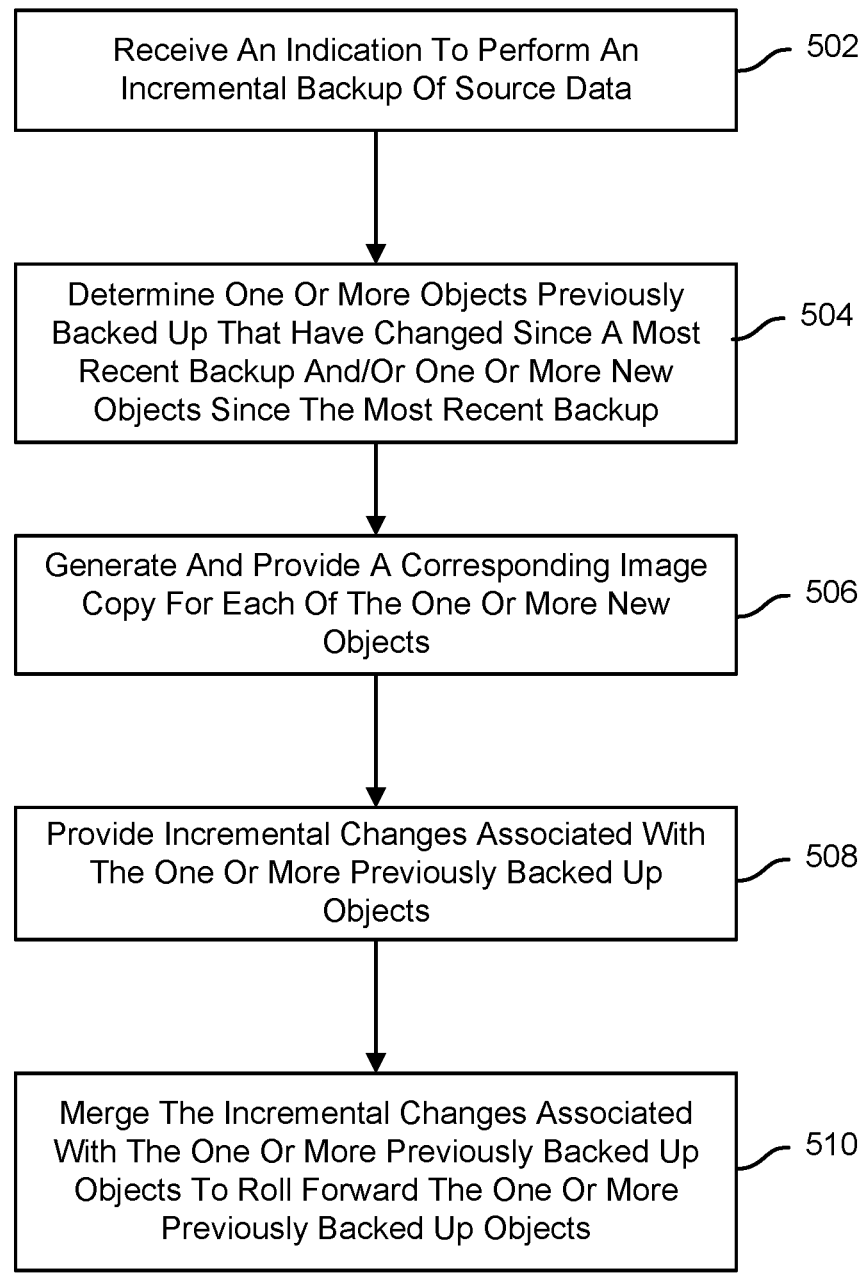
FIG. 5 is a flow diagram illustrating a process for updating a backup view of an application in accordance with some embodiments.

FIG. 5 is a flow diagram illustrating a process for updating a backup view of an application in accordance with some embodiments. In the example shown, process 500 may be implemented by a source system, such as source system 102. In some embodiments, process 500 is implemented to perform some of step 208 of process 200.

At 502, an indication to perform an incremental backup of source data is received. An application hosted on the source system receives a request to perform an incremental backup.

At 504, one or more previously backed up objects that have changed since a most recent backup and/or one more new objects since the most recent backup are determined.

A storage system maintains a backup view of the application. The application inspects the backup view of the application to determine the one or more image copies of objects that are backed up to the storage system.

The application includes a BCT, which indicates the one or more blocks that have changed since the most recent backup. If enabled, the BCT updates a block change tracking file when a data block has changed. The application may inspect the block change tracking file to determine which object(s) the one or more changed data blocks are associated with.

The application maintains a data structure that indicates the one or more objects associated with the application that were previously backed up to the storage system and backup information associated with each of the one or more objects. The application inspects the data structure to determine whether an object associated with one or more changed data blocks is included in the data structure. The application determines an object to be a new object in the event the data structure does not include an entry for the object and the backup view of the application does not include a corresponding image copy of the object. The application determines an object to be an object that was previously backed up in the event the data structure includes an entry for the object and the backup view of the application includes a corresponding image copy of the object. The application is unaware that an object may have been previously backed up if the data structure does not include an entry for the object.

At 506, the application generates a corresponding image copy for each of the one or more new objects and provides the corresponding image copies to the storage system. In some embodiments, an image copy corresponds to a new object. In some embodiments, an image copy corresponds to an object having a percentage of change since a most recent backup that is greater than the threshold percentage. Prior to process 500 starting, a storage system, such as at step 406 of process 400, requested the application to remove an entry corresponding to the object having a percentage of change since a most recent backup greater than the threshold percentage from the application's data structure. The application is configured to generate an image copy of an object in the event the data structure does not include an entry for the object. Thus, the application generates an image copy of the object even though the object was previously backed up.

The application updates the data structure to include a corresponding entry for each of the one or more new objects after the corresponding image copies are received and stored by the storage system.

At 508, incremental changes associated with the one or more previously backed up objects are provided to a storage system. The application generates one or more files corresponding to the incremental changes associated with one or more previously backed up objects. The one or more files corresponding to the incremental changes associated with one or more previously backed up objects are in a proprietary format associated with the application.

In some embodiments, steps 506 and 508 are reversed. In some embodiments, steps 506 and 508 are performed in parallel.

At 510, the incremental changes associated with the one or more previously backed up objects are merged with the backed up image copies of the one or more previously backed up objects to roll forward the backed up image copies of the one or more previously backed up objects.

For each previously backed up object, the application reads the one or more files corresponding to the incremental changes to identify the changed blocks associated with the object, extracts the identified blocks from the one or more files corresponding to the incremental changes, and applies the changes to an image copy of the object that is stored on the storage system. The incremental changes associated with the object are merged with the image copy of the object to generate the fully hydrated backup of the object.

Figure 6A:
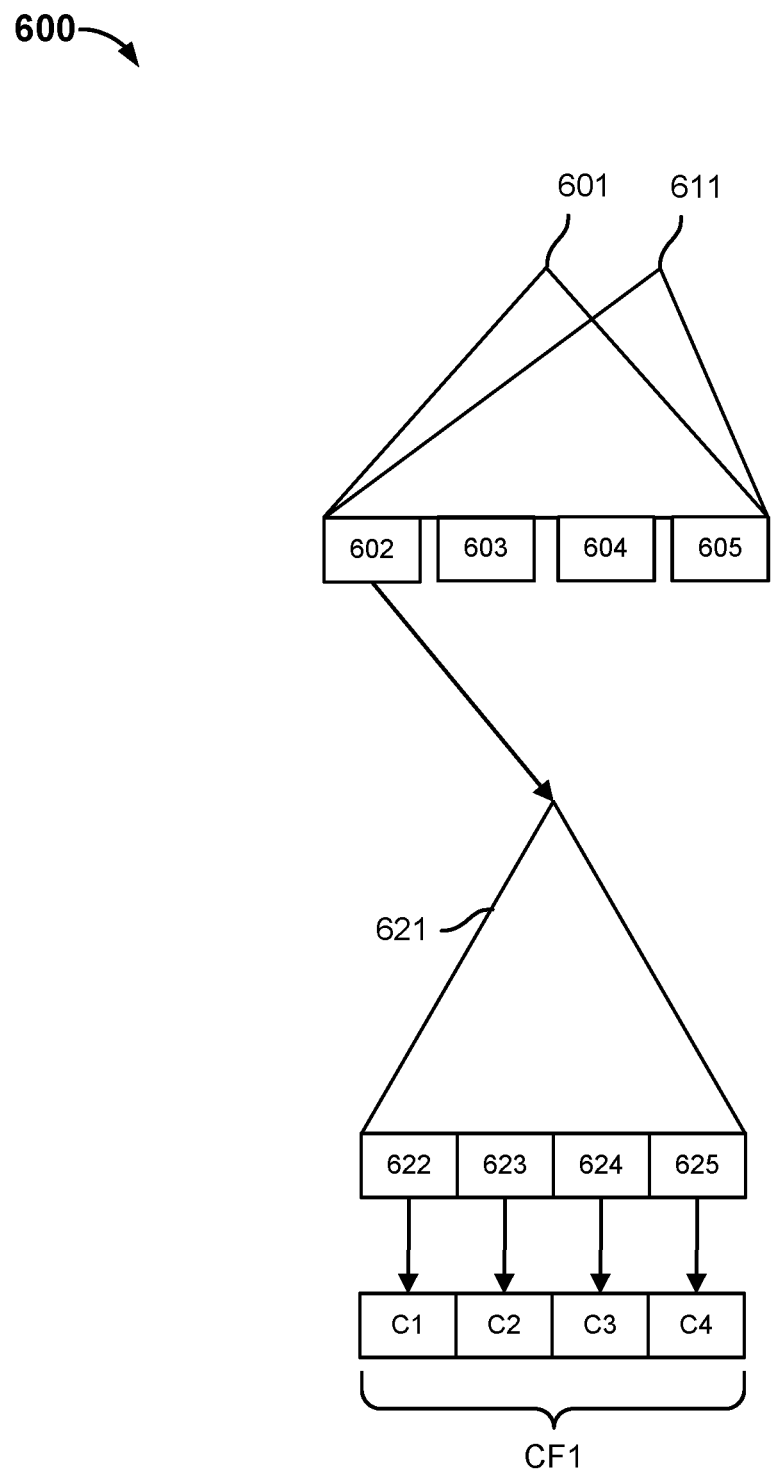
FIGS. 6A-6B are diagrams illustrating a process of generating metadata for an object having a percentage of change since a most recent backup that is not greater than a threshold percentage in accordance with some embodiments.
Figure 6B:
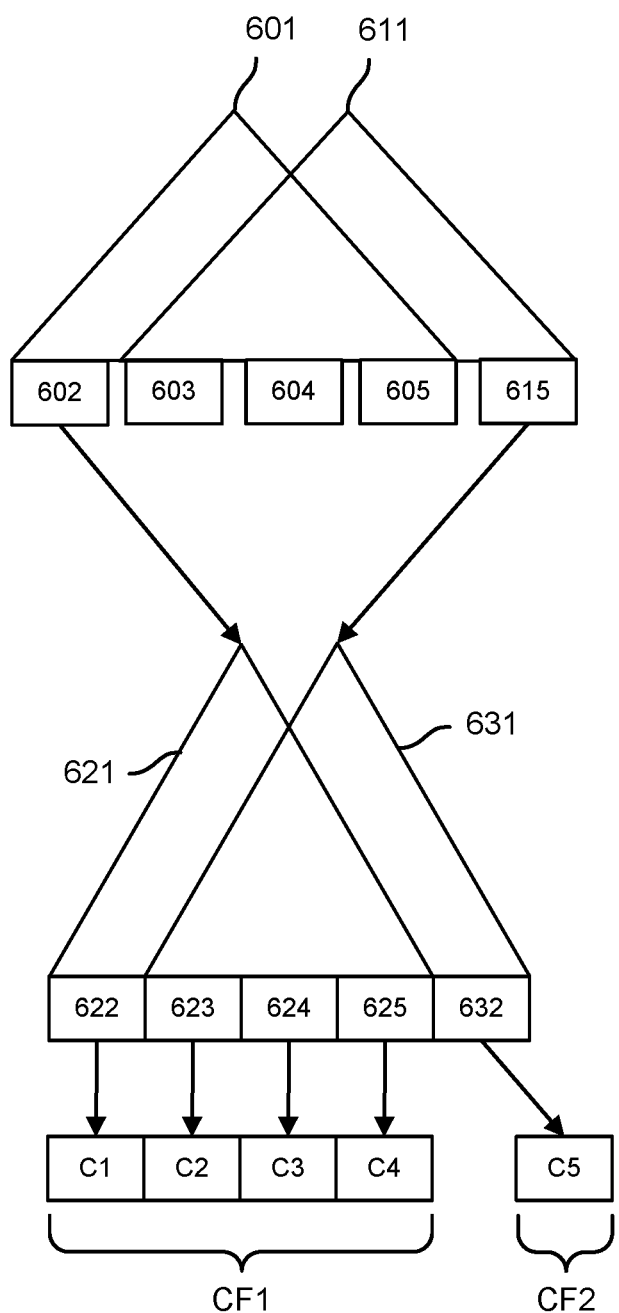

FIGS. 6A-6B are diagrams illustrating a process of generating metadata for an object having a percentage of change since a most recent backup that is not greater than a threshold percentage in accordance with some embodiments. FIG. 6A depicts views 600 that include a first view having a snapshot tree 601 and a first object metadata structure 621 and a second view having a snapshot tree 611 and the first object metadata structure 621.

The first view corresponds to a first backup of an application. Snapshot tree 601 includes leaf nodes 602, 603, 604, 605. Leaf node 602 includes a pointer to a root node (not shown) of object metadata structure 621. Object metadata structure 621 includes leaf nodes 622, 623, 624, and 625. Leaf nodes 622, 623, 624, and 625 store corresponding brick identifiers. In this example, each of the corresponding brick identifiers is associated with a single data chunk. Leaf node 622 is associated with data chunk C1, leaf node 623 is associated with data chunk C2, leaf node 624 is associated with data chunk C3, and leaf node 625 is associated with data chunk C4. Data chunks C1, C2, C3, and C4 are stored in chunk file CF1.

The first view corresponding to the first backup snapshot of the application is cloned to generate a view corresponding to a backup view of the application. The second view comprised of snapshot tree 611 and the first object metadata structure 621 corresponds to the cloned view.

The second view of the application is modified to represent the incremental changes to the application that were backed up in the second backup of the application. In this example, the percentage of change since a most recent backup for the object corresponding to object metadata structure 621 is not greater than the threshold percentage. Thus, an incremental backup of an object corresponding to object metadata structure 621 is performed. The incremental changes to the object, as depicted in the view 650 of FIG. 6B, are represented by modifying the snapshot tree 611 to reference leaf node 615 instead of leaf node 602, cloning object metadata structure 621 to be object metadata structure 631, storing a pointer to a root node of object metadata structure 631 as the value for leaf node 615, and modifying object metadata structure 631 to reference leaf node 632 instead of leaf node 622.

The rolled forward version of the object includes data chunks C2, C3, C4, and C5. Data chunks C2, C3, C4 are stored in chunk file CF1 and data chunk C5 is stored in chunk file CF2.

Figure 7A:
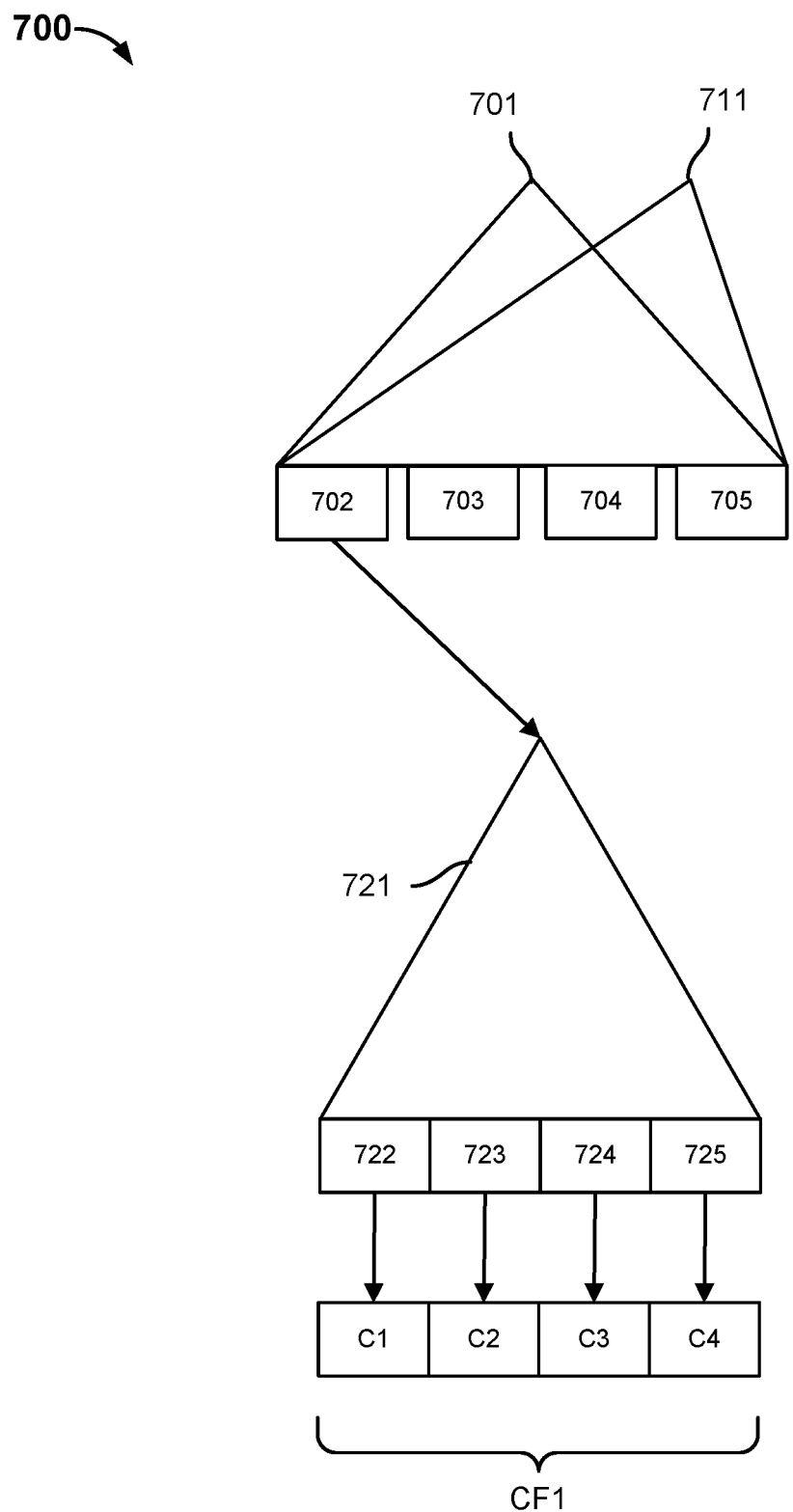
FIGS. 7A-7C are diagrams illustrating a process for generating metadata for an object having a percentage of change since a most recent backup greater than a threshold percentage in accordance with some embodiments.
Figure 7B:
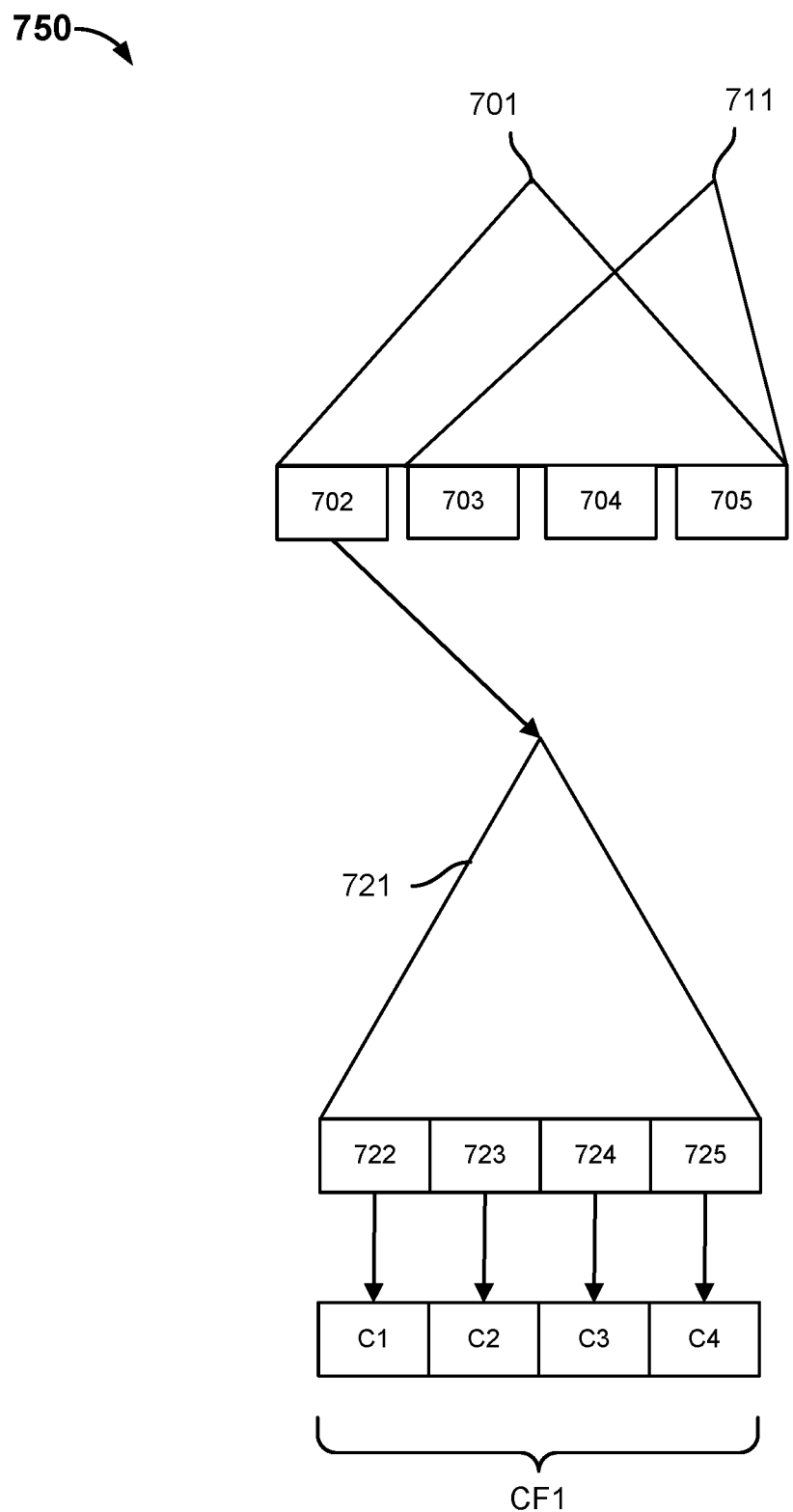
Figure 7C:
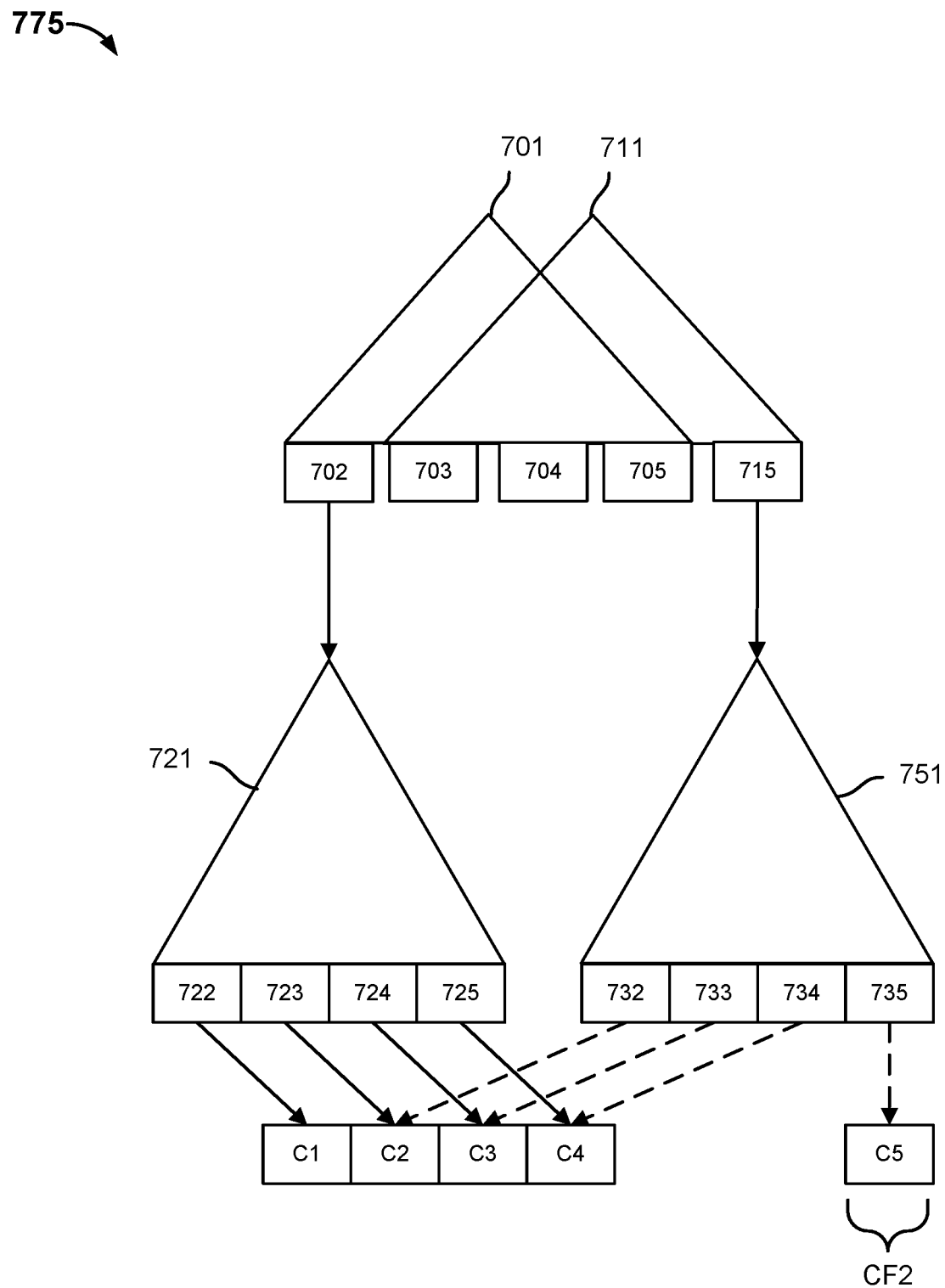

FIGS. 7A-7C are diagrams illustrating a process for generating metadata for an object having a percentage of change since a most recent backup that is greater than a threshold percentage in accordance with some embodiments. FIG. 7A depicts views 700, which include a first view having a snapshot tree 701 and a first object metadata structure 721 and a second view having a snapshot tree 711 and the first object metadata structure 721.

The first view corresponds to a first backup of an application. Snapshot tree 701 includes leaf nodes 702, 703, 704, 705. Leaf node 702 includes a pointer to a root node (not shown) of object metadata structure 721. Object metadata structure 721 includes leaf nodes 722, 723, 724, and 725. Leaf nodes 722, 723, 724, and 725 store corresponding brick identifiers. In this example, each of the corresponding brick identifiers is associated with a single data chunk. Leaf node 722 is associated with data chunk C1, leaf node 723 is associated with data chunk C2, leaf node 724 is associated with data chunk C3, and leaf node 725 is associated with data chunk C4. Data chunks C1, C2, C3, and C4 are stored in chunk file CF1.

The first view corresponding to the first backup of the application is cloned after the first backup is completed to generate a view corresponding to a backup view of the application.

Prior to an incremental backup of the application being performed, the storage system deletes an image copy of an object having a percentage of change since a most recent backup greater than the threshold percentage from a backup view of the application and sends to the application a request to remove from the data structure the entry corresponding to the object having a percentage of change since a most recent backup greater than the threshold percentage. In response, the application is configured to modify the data structure as requested.

The metadata is updated to reflect the image copy deletion. As seen in the view 750 of FIG. 7B, the metadata associated with the object having a percentage of change since a most recent backup greater than the threshold percentage is deleted by modifying snapshot tree 711 not to reference leaf node 702.

Subsequently, the storage system sends to the application a request to perform an incremental backup. In response to receiving the request, the application inspects the backup view of the application and utilizes the data structure to determine whether to generate an image copy of an object or one or more files corresponding to the incremental changes associated with an object. The application determines to generate an image copy of the object because the data structure does not include an entry for the object.

The storage system ingests and stores the data associated with the object having a percentage of change since a most recent backup that is greater than the threshold percentage. The storage system performs deduplication (e.g., in-line deduplication, post-processing deduplication, partial in-line deduplication, and partial post-processing deduplication, etc.) on the ingested data. This reduces the amount of storage used to store the data associated with the object having a percentage of change since a most recent backup greater than the threshold percentage. As seen in view 775 of FIG. 7C, the storage system generates metadata corresponding to a full backup of the object having a percentage of change since a most recent backup that is greater than the threshold percentage by generating object metadata structure 751 that corresponds to the object and modifying snapshot tree 711 to include a pointer from leaf node 715 to a root node (not shown) of object metadata structure 751. As seen in FIG. 7C, data chunk C5 is stored by the storage system, but the storage system does not store duplicate copies of data chunks C2, C3, and C4. Instead, leaf nodes 732, 733, 734 store corresponding brick identifiers that are associated with data chunks C2, C3, and C4. Leaf node 735 stores a brick identifier that is associated with data chunk C5.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
performing a first backup of a source data;
determining a plurality of objects that have changed since the first backup, wherein each object of the plurality of objects is associated with a corresponding image copy;
for each object of the plurality of objects, based on a corresponding backup type for the object, deleting or refraining from deleting the corresponding image copy associated with the object, wherein the corresponding backup type is associated with an amount the object has changed since the first backup; and
based on whether the corresponding image copy associated with each object of the plurality of objects was deleted or not deleted, performing a second backup of the source data including by performing an incremental backup of a first portion of the plurality of objects using a first tree data structure when the corresponding image copy was not deleted and a full backup of a second portion of the plurality of objects using a different second tree data structure when the corresponding image copy was deleted, wherein the second backup includes one or more objects representing the incremental backup and one or more objects representing the full backup.

2. The method of claim 1, wherein the first backup is a first full backup of the source data.

3. The method of claim 1, wherein the first backup is a first incremental backup of the source data.

4. The method of claim 1, wherein determining the plurality of objects that have changed since the first backup includes querying an application associated with the source data to identify the plurality of objects that have changed since a most recent backup.

5. The method of claim 1, further comprising determining the corresponding backup type for each object of the plurality of objects by querying an application associated with the source data to determine the amount the object has changed since the first backup.

6. The method of claim 5, further comprising:
receiving from the application a query response that includes, for each object of the plurality of objects, the amount the object has changed since the first backup; and
comparing, for each object of the plurality of objects, the amount the object has changed since the first backup to a threshold amount.

7. The method of claim 6, wherein the corresponding backup type for an object of the plurality of objects that has changed an amount since the first backup that is greater than the threshold amount is associated with a full backup.

8. The method of claim 6, wherein the corresponding backup type for an object of the plurality of objects that has changed an amount since the first backup that is not greater than the threshold amount is associated with an incremental backup.

9. The method of claim 1, wherein performing the incremental backup includes receiving one or more files associated with one or more objects included in the first portion of the plurality of objects.

10. The method of claim 9, wherein an application associated with the source data is configured to merge incremental changes associated with the one or more objects included in the one or more files associated with the one or more objects to one or more corresponding image copies of the one or more objects included in the first portion of the plurality of objects.

11. The method of claim 1, wherein, for each object included in the second portion of the plurality of objects, the corresponding image copy is deleted from a backup view of the source data.

12. The method of claim 11, further comprising providing to an application associated with the source data a request to remove from a data structure one or more entries corresponding to each object included in the second portion of the plurality of objects.

13. The method of claim 12, wherein an entry included in the data structure indicates a backup status of an object.

14. The method of claim 12, further comprising requesting the second backup of the source data to be performed.

15. The method of claim 14, wherein performing the second backup includes ingesting a corresponding full backup of one or more objects included in the second portion of the plurality of objects.

16. The method of claim 15, wherein performing the second backup includes deduplicating data included in the corresponding full backup of the one or more objects included in the second portion of the plurality of objects.

17. The method of claim 1, further comprising determining the corresponding backup type for each object of the plurality of objects by, for each object of the plurality of objects:
 comparing the amount the object has changed since the first backup to a threshold amount, and
 selecting, based on the comparison, the corresponding backup type for the object.

18. A computer program product embodied in a non-transitory computer readable medium and comprising computer instructions for:
 performing a first backup of a source data;
 determining a plurality of objects that have changed since the first backup, wherein each object of the plurality of objects is associated with a corresponding image copy;
 for each object of the plurality of objects, based on a corresponding backup type for the object, deleting or refraining from deleting the corresponding image copy associated with the object, wherein the corresponding backup type is associated with an amount the object has changed since the first backup; and
 based on whether the corresponding image copy associated with each object of the plurality of objects was deleted or not deleted, performing a second backup of the source data including by performing an incremental backup of a first portion of the plurality of objects using a first tree data structure when the corresponding image copy was not deleted and a full backup of a second portion of the plurality of objects using a different second tree data structure when the corresponding image copy was deleted, wherein the second backup includes one or more objects representing the incremental backup and one or more objects representing the full backup.

19. The computer program product of claim 18, wherein the computer readable medium comprises computer instructions for determining the corresponding backup type for each object of the plurality of objects by querying an application associated with the source data to determine the amount the object has changed since the first backup.

20. A system, comprising:
 one or more processors configured to:
  perform a first backup of a source data;
  determine a plurality of objects that have changed since the first backup, wherein each object of the plurality of objects is associated with a corresponding image copy;
  for each object of the plurality of objects, based on a corresponding backup type for the object, delete or refrain from deleting the corresponding image copy associated with the object, wherein the corresponding backup type is associated with an amount the object has changed since the first backup; and
  based on whether the corresponding image copy associated with each object of the plurality of objects was deleted or not deleted, perform a second backup of the source data including by performing an incremental backup of a first portion of the plurality of objects using a first tree data structure when the corresponding image copy was not deleted and a full backup of a second portion of the plurality of objects using a different second tree data structure when the corresponding image copy was deleted, wherein the second backup includes one or more objects representing the incremental backup and one or more objects representing the full backup; and
 a memory coupled to at least a portion of the one or more processors and configured to provide at least the portion of the one or more processors with instructions.

\* \* \* \* \*